(12) United States Patent
Sato et al.

(10) Patent No.: US 6,970,989 B2
(45) Date of Patent: Nov. 29, 2005

(54) VOLUME MANAGEMENT METHOD AND APPARATUS

(75) Inventors: Yoshitaka Sato, Yokohama (JP); Hiroshi Nojima, Fujisawa (JP); Nobuyuki Yamashita, Yokohama (JP); Tatsundo Aoshima, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 349 days.

(21) Appl. No.: 10/301,215

(22) Filed: Nov. 21, 2002

(65) Prior Publication Data
US 2003/0191919 A1    Oct. 9, 2003

(30) Foreign Application Priority Data
Apr. 8, 2002    (JP) .............................. 2002-104651

(51) Int. Cl.[7] ............................................ G06F 12/00
(52) U.S. Cl. ...................................... 711/169; 711/154
(58) Field of Search .................................. 711/169, 154

(56) References Cited

U.S. PATENT DOCUMENTS

| | | | |
|---|---|---|---|
| 6,182,258 B1 * | 1/2001 | Hollander | 714/739 |
| 2002/0103943 A1 * | 8/2002 | Lo et al. | 710/2 |
| 2003/0061342 A1 * | 3/2003 | Abdelhadi et al. | 709/224 |
| 2003/0135650 A1 * | 7/2003 | Kano et al. | 709/248 |
| 2004/0199715 A1 * | 10/2004 | Ellis et al. | 711/105 |

FOREIGN PATENT DOCUMENTS

| | | |
|---|---|---|
| JP | 62-134735 | 6/1987 |
| JP | 08-101763 | 4/1996 |
| JP | 11-212875 | 8/1999 |
| JP | 2000-132343 | 5/2000 |
| JP | 2000-242437 | 9/2000 |
| JP | 2000-339104 | 12/2000 |
| JP | 2001-216185 | 8/2001 |
| JP | 2001-318833 | 11/2001 |

* cited by examiner

Primary Examiner—Matthew D. Anderson
Assistant Examiner—Hetul Patel
(74) Attorney, Agent, or Firm—Mattingly, Stanger, Malur & Brundidge, P.C.

(57) ABSTRACT

A volume control system in a storage area network environment, which is capable of executing volume operation requests in multiple stages, and is also capable of canceling an erroneous volume operation even after the operation has been executed by the user. A volume operation request for executing run commands from the user is analyzed, and parameters for executing the volume operation request are created by a program that operates the storage apparatus. Each of the parameters is provided with an attribute indicating as to whether cancellation is possible or as to when the execution is to be performed. If cancellation of the run command is possible, a parameter for canceling the run command is created simultaneously. The run commands may be executed on the basis of the parameters after verifying by a simulation as to whether or not the various parameters created are correct. At this point, the user may select whether to execute the run commands promptly or in stages. When the user selects executing the run commands in stages, the user registers execution conditions for executing the run commands. In the event the user makes a cancellation request before the registered execution conditions are fulfilled, any of the run commands that has been executed can be cancelled by using cancellation parameters.

18 Claims, 9 Drawing Sheets

Command List Management Table — 300

| Command List ID No. | Detailed Info of Command List | |
|---|---|---|
| | Items | Contents |
| 0001 | User's Request ⟵321 | Remove HOSTA VOLUMEA ⟵331 |
| | Execution State ⟵322 | Being Executed ⟵332 |
| | Execution Mode ⟵323 | Execute in stages ⟵333 |
| | Execution Condition ⟵324 | Execute in 3 hrs. ⟵334 |
| 0002 | User's Request | Add 50G as VOLUMBA to HOSTA |
| | Execution State | Pre-Execution |
| | Execution Mode | Immediately Execute |
| | Execution Condition | null |
| ⋮ | ⋮ | ⋮ |

Command Management Table 400

| Command List ID No. | Command ID No. | Detailed Info of Commands | |
|---|---|---|---|
| | | Item | Contents |
| 0001 | 001 | Execution State | Executed — 451 |
| | | Execution Command | Remove Volume VOLUMEA — 452 |
| | | Cancellation Command | Add Volume LUA as VolumeA — 453 |
| 0001 | 002 | Execution State | Being executed — 461 |
| | | Execution Command | Remove Path LUA HOSTA — 462 |
| | | Cancellation Command | Add Path LUA HOSTA — 463 |
| 0001 | 003 | Execution State | Pre-execution — 471 |
| | | Execution Command | Remove LU LUA — 472 |
| | | Cancellation Command | null — 473 |
| 0002 | 001 | Execution State | Pre-execution |
| | | Execution Command | Add LU 50G as LUA |
| | | Cancellation Command | Remove LU LUA |
| 0002 | 002 | Execution State | Pre-execution |
| | | Execution Command | Add Path LUA HOSTA |
| | | Cancellation Command | Remove Path LUA HOSTA |
| 0002 | 003 | Execution state | Pre-execution |
| | | Execution Command | Add Volume LUA as VOLUMEA |
| | | Cancellation Command | Remove Volume VOLUMEA |
| ⋮ | ⋮ | ⋮ | ⋮ |

VOLUME MANAGEMENT METHOD AND APPARATUS

BACKGROUND OF THE INVENTION

1. Field of the Invention

The present invention relates to a volume management technology for storage area networks, which enables delaying the execution of run commands at the request of the user and even canceling the run commands after their execution at the request of the user.

2. Related Background Art

In recent years, corporations have seen the increase in the amount of data that need to be managed with the proliferation of information technology, including the Internet. While conventional methods involves managing storage areas directly connected to the host computer, the recent trend has been to create a dedicated storage area network to independently control the storage from the host computer due to the demand for larger capacity and reliability.

In a storage network environment, in order to allocate volumes between the host and the storages, it is necessary to perform a process to create logical volumes within the storage, a process to allocate paths between the host and the storage, a volume recognition process and an initialization process by the host. The term "volume" means a data storage area that is opened by the storage and created within the logical volume, and made accessible from the host. Also, the term "logical volume" means a data storage area created within the storage apparatus and opened to the host.

Run commands in the storage network have become increasingly complex compared to the conventional storage configuration that is directly connected to the host, and is expected to become even more complex due to the increase in the number of paths as the storage capacity and the number of hosts comprising the storage area network increases.

In a storage network environment, many run commands for executing volume allocation and deletion are often directly executed on the hardware. Frequently, the original state cannot be restored once the commands are executed. Also, as explained above, the run commands for storage area network have become complicated because of the increase in the storage capacity and the number of hosts that comprise the storage area network. Because of this, corporations could suffer serious losses due to errors made by users. For example, there may be occasions when the user may erroneously delete the important data storage area when changing the configuration of the system.

Because of this type of situation, it is necessary to have a function to restore the status to the point prior to the commencement of the run command at the request of the user to manage the volume in a storage network environment. One method has been proposed to manage compatibility between the run commands and the state of the system in an environment that collectively control the run commands for the system. However, the conventional art does not describe a technique that collectively execute plural run commands for the server, switches and storages as in the case of volume control in a storage network environment.

SUMMARY OF THE INVENTION

The present invention provides a volume control method and apparatus in a storage area network environment, which enables execution of volume operation requests in multiple stages, and enables cancellation of an erroneous volume operation even after the operation has been executed by the user.

In accordance with an embodiment of the present invention, a volume operation request for executing run commands from the user is analyzed, and parameters for executing the volume operation request are created by a program that operates the storage apparatus.

Each of the parameters may be provided with an attribute indicating as to whether cancellation is possible or as to when the execution is to be performed. If cancellation of the run command is possible, a parameter for canceling the run command is created simultaneously.

The run commands may be executed on the basis of the parameters after verifying by a simulation as to whether or not the various parameters created are correct. At this point, the user may select whether to execute the run commands promptly or in stages. When the user selects executing the run commands in stages, the user registers execution conditions for executing the run commands.

In the event the user makes a cancellation request before the registered execution conditions are fulfilled, any of the run commands that has been executed may be cancelled by using cancellation parameters for restoring the condition to its original state.

The volume control system in accordance with the present embodiment executes the volume operation request in the manner described above. As the executed run commands can be cancelled any time until the user-registered execution conditions are fulfilled in the execution of the run commands in stages, the operation can be cancelled even after the volume operation has been executed erroneously by the user. Also, as the parameters are verified before the run commands are executed, the user's error can be detected even before the execution of the run commands.

Other features and advantages of the invention will be apparent from the following detailed description, taken in conjunction with the accompanying drawings that illustrate, by way of example, various features of embodiments of the invention.

DESCRIPTION OF PREFERRED EMBODIMENT OF THE INVENTION

Descriptions are made below as to a volume control method that enables execution of volume operations in multiple stages, and that enables the cancellation of commands until execution conditions for the commands registered by the user are fulfilled.

Figure 2:
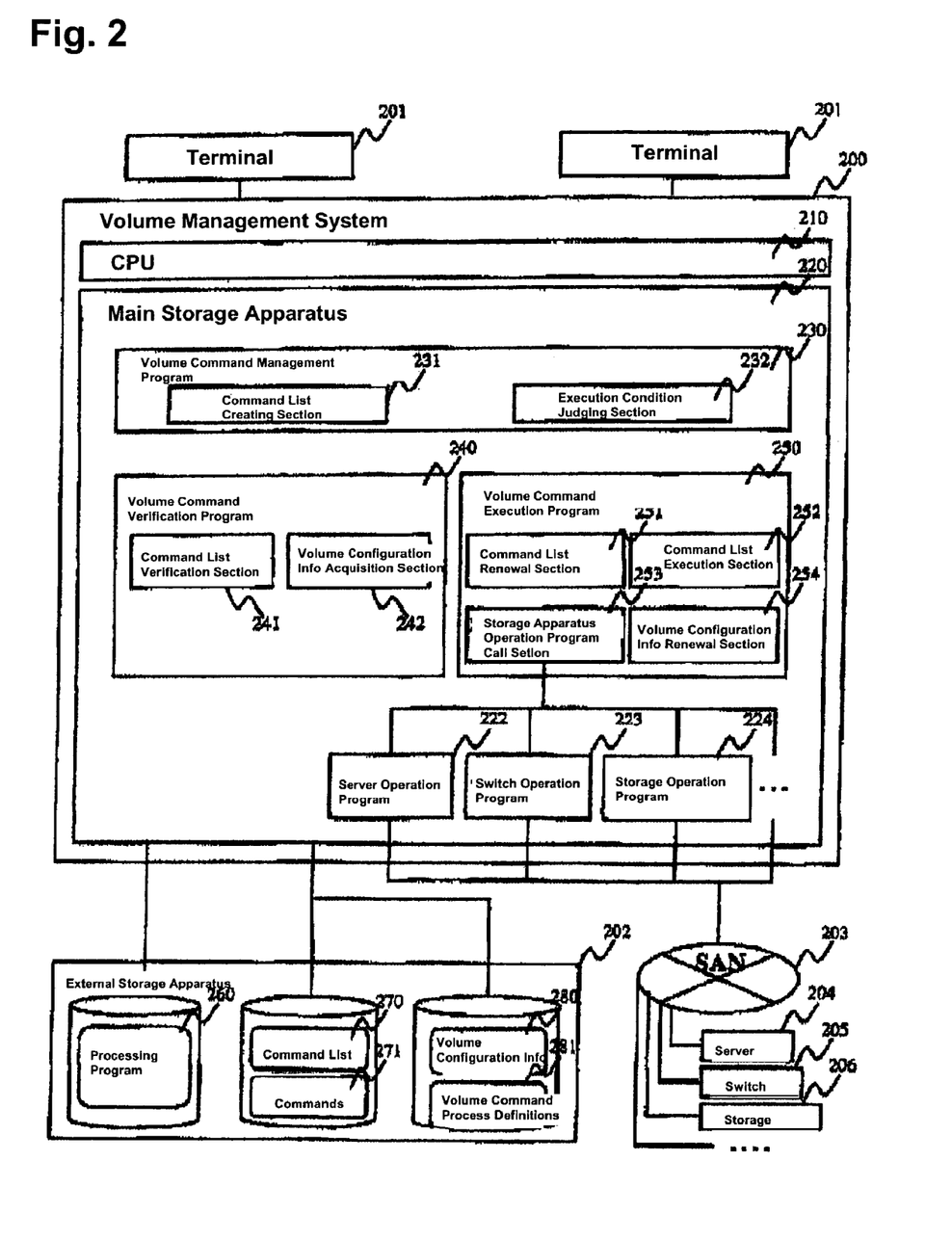
FIG. 2 shows a function block diagram and a hardware configuration of the volume management system of the present embodiment.

First, FIG. 2 is used to explain a hardware configuration and a function block of the volume control system in accordance with an embodiment of the present invention.

A volume control system 200 is typically formed form a CPU 210, a main storage apparatus 220, an external storage apparatuses 202 such as magnetic disks, a storage area network 203 to be operated and managed, which includes a server 204, a switch 205 and a storage 206, and a plurality of terminals 201.

Programs that are read into the main storage apparatus 220 include a volume command management program 230, a volume command verification program 240, a volume command execution program 250, a server operation program 222, a switch operation program 223 and a storage operation program 224. The external storage apparatus 202 stores a command list 270 which stores volume command information for realizing user's requests, commands 271, volume configuration information 280 representative of the configuration information of the volumes, and volume run command definitions 281 that define the procedures for converting user's requests into volume commands. Also, a processing program 260 for executing the volume command management program 230, the volume command verification program 240, the volume command execution program 250, the server operation program 222, the switch operation program 223, the storage operation program 224 is stored in the external storage apparatus 202.

The volume command management program 230 consists of a command list creation section 231 and an execution condition determination section 232. The volume command verification program 240 consists of a command list verification section 241 and a volume configuration information acquisition section 242. The volume command execution program 250 consists of a command list renewal section 251, a command list execution section 252, a storage apparatus operation program call section 253 and a volume configuration information renewal section 254.

Figure 1:
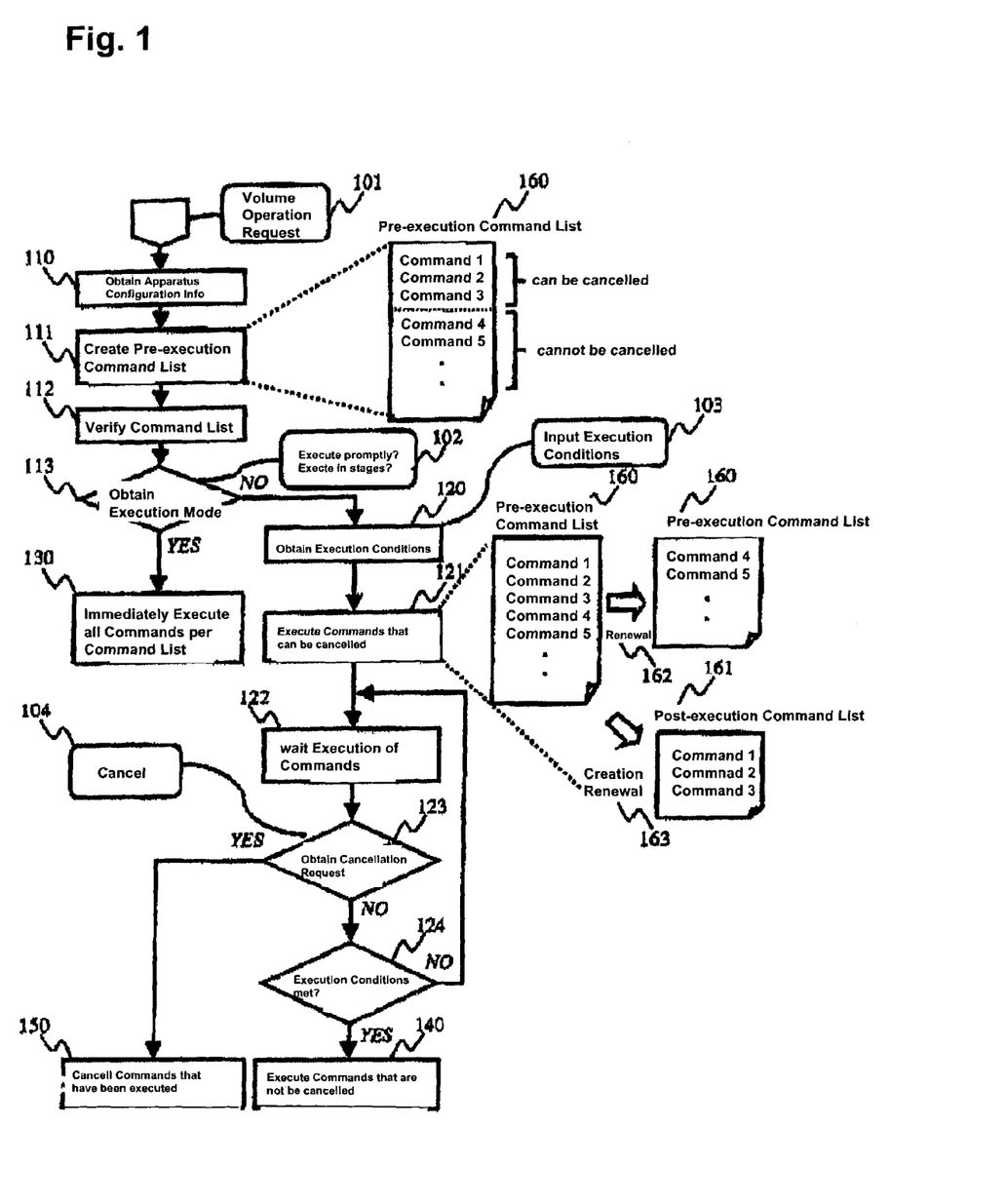
FIG. 1 is a conceptual diagram illustrating a volume management system in accordance with an embodiment of the present invention.

FIG. 1 is a flowchart that summarizes a flow of volume command processes in the volume control system 200 of the present embodiment.

First, the volume control system 200 receives a volume operation request 101 to execute run commands from the user.

In Step 110, the volume command management program 230 acquires from the volume configuration information 280 stored in the external storage apparatuses 202 volume run command definitions 281 relating to the user's volume operation request and configuration information on the server 204, the switch 205 and the storage 206 concerning the volume run command definitions. In Step 111, the configuration information acquired is used to create a pre-execution command list 160 through the command list creation section 231 in the volume command management program 230. In Step 112, the pre-execution command list 160 is verified before the execution of the run commands through the simulation performed by the command list verification section 241 of the volume command verification program 240.

In Step 113, the volume command management program 230 requests the user to make a selection 102 as to whether the execution of the run commands created in the pre-execution command list 160 is to be carried out immediately or in stages, to acquire an execution mode for the pre-execution command list 160. If the user selects the immediate execution, the run commands are immediately executed all together, and if the execution in stages is selected, the commands are executed in stages in accordance with the execution conditions designated by the user. First, the process performed when the user selects an immediate execution is described.

In Step 130, if the user selects an immediate execution, the parameters in the pre-execution command list 160 are used to execute the command list execution section 252 in the volume command execution program 250, and the run commands for the server 204, the switch 205 and the storage 206 by using the operation programs 222–224 for the storage apparatuses.

Next, the process performed when the user selects the execution in stages is explained.

In Step 120, if the user selects the execution in stages, the volume command management program 230 requests the user to provide an input 103 of execution conditions and acquires the execution conditions.

In Step 121, the volume command execution program 250 uses the parameters in the pre-execution command list 160 to execute the command list to run the commands on the server 204, the switch 205 and the storage 206. At this time, if a pre-designated non-cancelable run command appears, the succeeding run commands, including this run command, will not be executed. When the run commands are executed, the volume command execution program 250 grasps the state of executing the respective parameters within the command list by performing a renewal 162 of the pre-execution command list 160, and a creation and renewal 163 of a post-execution command list 161.

In Step 122, the volume command management program 230 suspends the continuation of execution of the run commands in a standby state until a wait time pre-registered in the execution conditions is expired or a registered event occurs.

In Step 123, if the user issues a cancellation request 104 to the volume control system 200 while the run command is being suspended, the executed run commands will be cancelled. In the event no cancellation request 104 is received from the user, the standby state in Step 122 is continued. Next, a process that takes place when a cancellation request 104 is received from the user is described.

In Step 150, when the cancellation request 104 is received, the run commands that have been already executed are cancelled through an executed command cancellation process. A cancellation parameter in the post-execution command list 161 created in Step 121 is used to cancel the run commands.

Next, a process that takes place when a cancellation request 104 is not received from the user is described.

In Step 124, the volume command management program 230 uses the execution condition determination section 232 to check whether the execution conditions registered by the user are fulfilled. If the conditions are met, the run commands will be executed in Step 140. If the conditions are not met, the run commands will be placed on a standby state in Step 121. In Step 140, those of the run commands that have not been executed in Step 121 are executed by the command list execution section 252 of the volume command execution program 250. The pre-execution command list 160 is used for executing the run commands.

Figure 3:
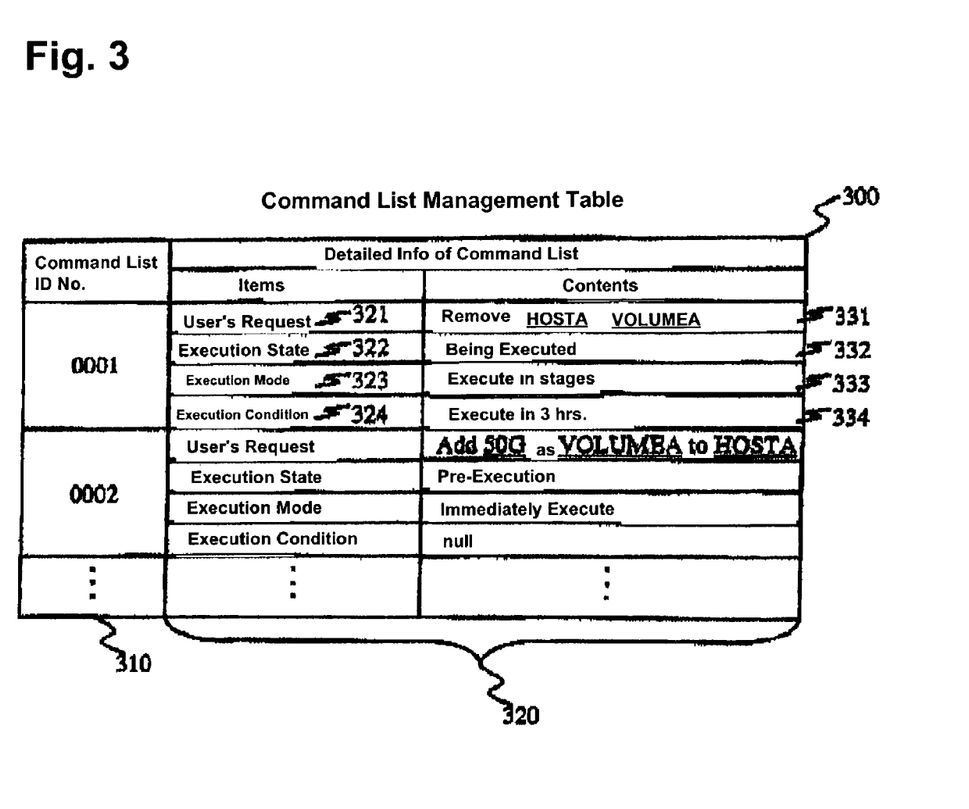
FIG. 3 shows a data structure of a command list control table that is created in the volume management system of the present embodiment.

FIG. 3 shows a data structure of a command list control table of the command lists 270 stored in external storage apparatus 202 in the volume control system 200. The command list control table 300 includes command list identification numbers 310 and command list detailed information 320. The command list detailed information 320 includes a user request 321, an execution state 322, an execution form 323 and an execution condition 324 for each of the command list identification numbers 310.

The command list identification numbers 310 are created for the entire command lists to uniquely specify the respective command lists in the volume control system 200. Each of the command list identification numbers 310 is composed, for example, of four-digits. The user request 321 stores information acquired by the volume control system 200 as the user's request (volume operation request 101) in the form of a character string or binary data. The execution state 322 stores numbers or a character string indicating whether the state of execution of the command list is before execution, in the process of execution or after execution. The execution form 323 stores numbers or a character string indicating whether the execution of the run command is to be carried out immediately or in stages. The execution condition 324 stores the contents registered as the execution conditions in the form of numbers or a character string when the user selects the execution of the run commands in stages.

As an example, the contents stored in FIG. 3 will be explained when a request to remove VOLUMEA from HOSTA, "Remove VOLUMEA HOSTA", is received from the user.

Content 331 indicates a request obtained from the user by the request volume control system 200 to create a command list identified by an identification number 0001. Content 332 indicates that the command list of the identification number 0001 is currently in the process of being executed. Content 333 indicates that the user has designated the execution of the command list for the identification number 0001 in stages. Content 334 indicates that the user has designated that all of the run commands whose execution state is in an unexecuted state to be executed after three hours for the command list of the identification number 0001.

Figure 4:
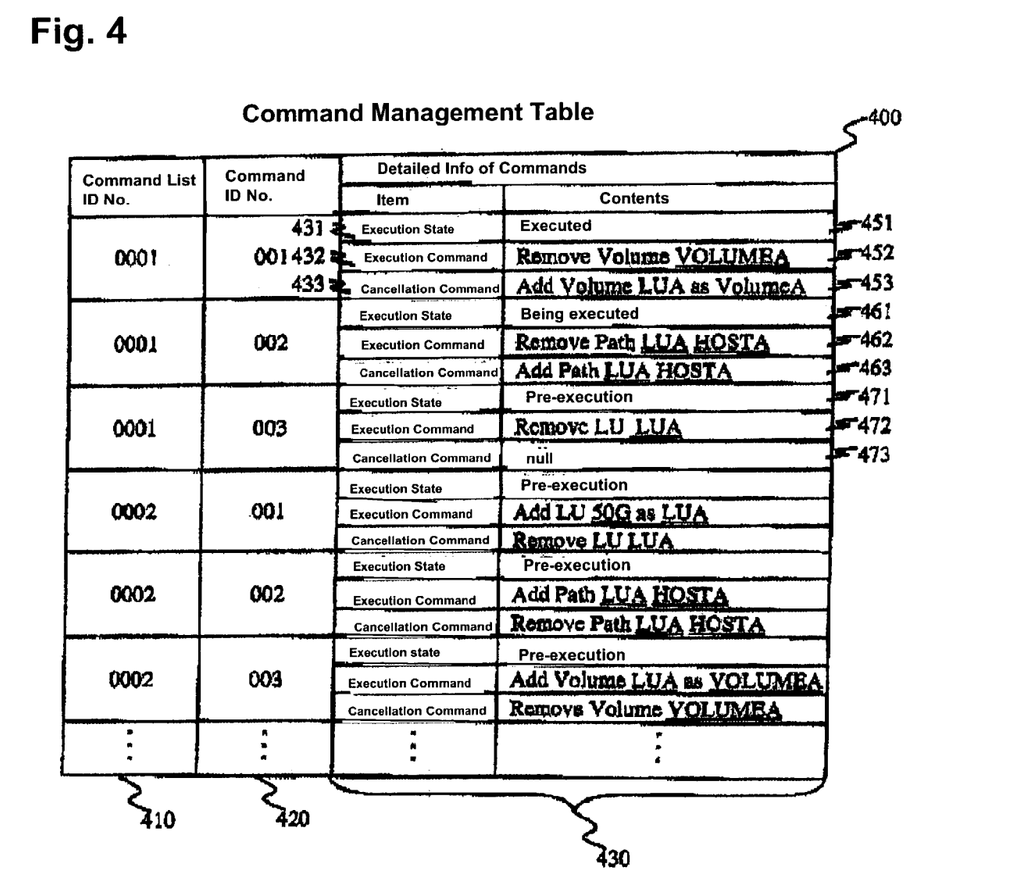
FIG. 4 shows a data structure of a command control table that is created in the volume management system of the present embodiment.

FIG. 4 shows a data structure for a control table of commands 271 stored in the external storage apparatus 202 in the volume control system 200. The commands 271 store the specific contents of commands in the order of the commands to be executed for each of the corresponding apparatuses in response to the user request 321 of FIG. 3.

The command control table 400 consists of command list identification numbers 410, command identification numbers 420 for the commands, and detailed information 430 of the commands. Each detailed information of the commands consists of an execution state 431, an execution command 432, and a cancellation command 433.

The commands 271 indicated in FIG. 4 are generated as the command list creation section 231 analyzes the user's request 231 by referring to the volume configuration information 280 and the volume run command definitions 281.

Each of the command identification numbers 420 is a unique number within one of the command lists created for the entire commands. It indicates the order of command for each of the apparatuses, and for example consists of a three-digit number. A combination of a command identification number and a command list identification number uniquely specifies one of the commands in the storage operation system 221.

The execution status 431 stores numbers or a character string that indicate whether the execution state of the corresponding command is in a state before execution, during execution or after execution. The execution command 432 stores parameters in a character string or in binary data necessary for the storage apparatus operating program 253 to execute the run commands for the server 204, the switch 205 and the storage 206, using the server operation program 222, the switch operation program 223 and the storage operation program 224. The cancellation command 433 stores in a character string or binary data parameters necessary for canceling commands executed by the storage apparatus control program 253 with the execution command 432. Information indicating the correlations between the execution command 432 and the cancellation command 433 is pre-set by the volume run command definition 281. If the execution command cannot be cancelled, the cancellation command 433 stores a character string, such as "null" to show that cancellation is not possible.

The following example explains contents to be stored in the command management table in FIG. 4 when a request to remove VOLUMEA from HOSTA "Remove HOSTA VOLUMEA" is received from the user.

Content 451 indicates that a run command with an identification number 0001-001 has already been executed, content 452 indicates a command that has been executed by the storage apparatus operation program, and content 453 indicates a command to be executed when canceling an executed command.

Content 461 indicates that a run command with an identification number 0001-002 is in the process of being executed, content 462 indicates a command that is being executed by the storage apparatus operation program, and content 463 indicates a command to be executed when canceling a command that is being executed.

Content 471 indicates that a run command with an identification number 0001-003 is before its execution, content 472 indicates a command that is to be executed by the storage apparatus operation program, and content 473 indicates a command to be executed when canceling a command that is to be executed.

Figure 5:
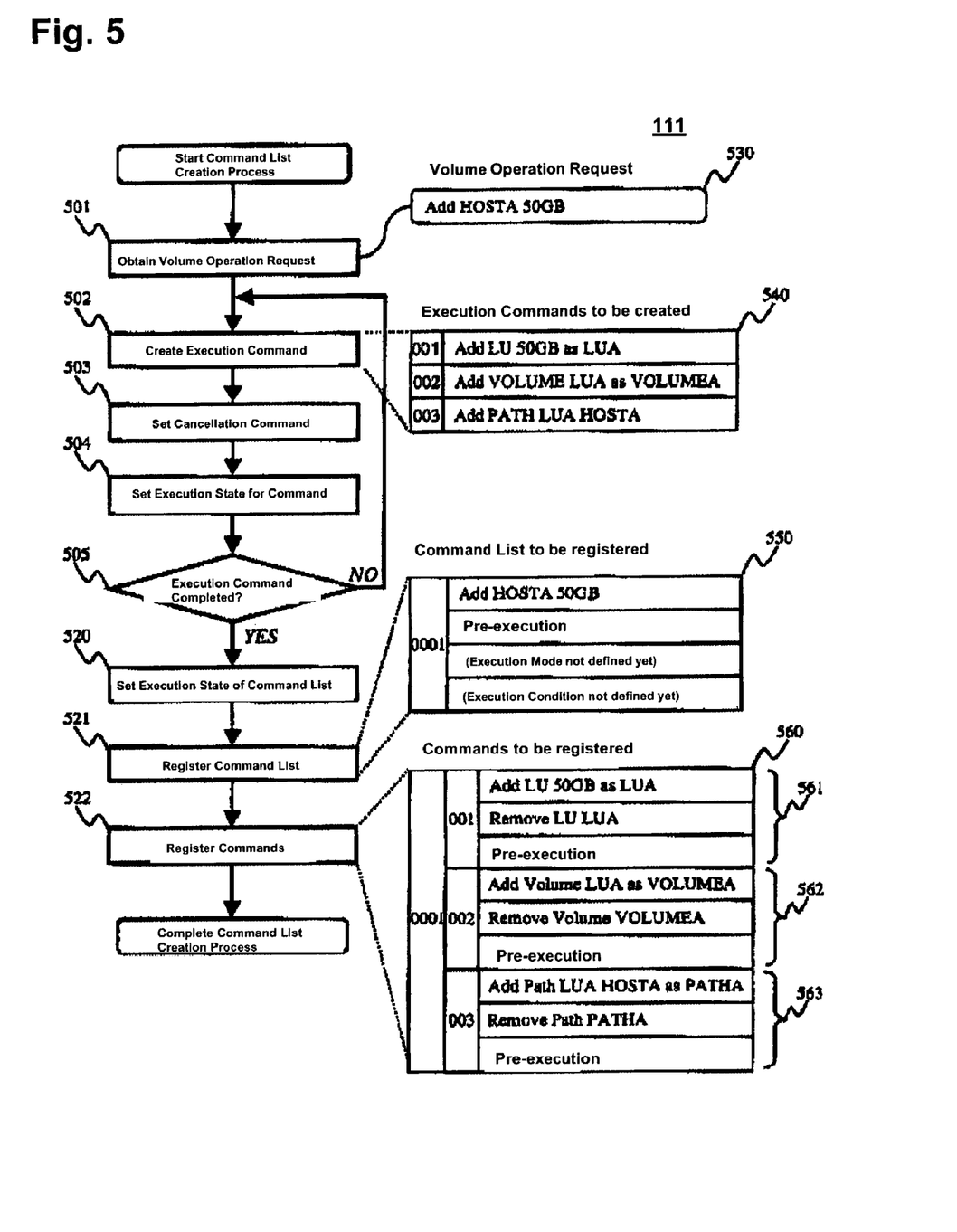
FIG. 5 shows a flowchart of a command list creating process in the volume management system of the present embodiment.

FIG. 5 is a detailed flow chart of the processes (Step 111) used when the volume setting control program 230 in accordance with the present embodiment shown in FIG. 1 creates a pre-execution command list when it receives from the user a volume operation request 530.

In Step 501, the volume command management program 230 acquires the volume operation request 530 from the user.

In Step 502, the command list creation section 231 analyzes the volume operation request 530 acquired in Step 501 and creates execution commands 540 by using the volume run command definitions 281 and the volume configuration information 280 stored in the external storage apparatus 202. In Step 503, the command list creation section 231 sets cancellation commands against the execution commands 540, using the execution commands created in Step 502 and the volume command definitions 281 stored in the external storage 202. In Step 504, the command list creation section 231 sets the execution statuses of the execution commands 540 as "Pre-Execution".

In Step 505, the command list creation section 231 repeats Step 503 through Step 504 to set all the items to be included for the execution commands 540.

In Step 520, the command list creation section 231 sets the execution status of a command list as "Pre-execution". In Step 521, the command list creation section 231 stores the created command list 550 in the external storage 202. In Step 522, the command list creation section 231 stores in the external storage 202 commands 560 that are created.

Through the steps described above, the command list thus created in response to the volume operation request 530 is stored in the command list 270 of the external storage 202 as a pre-execution command list 160.

Figure 6:
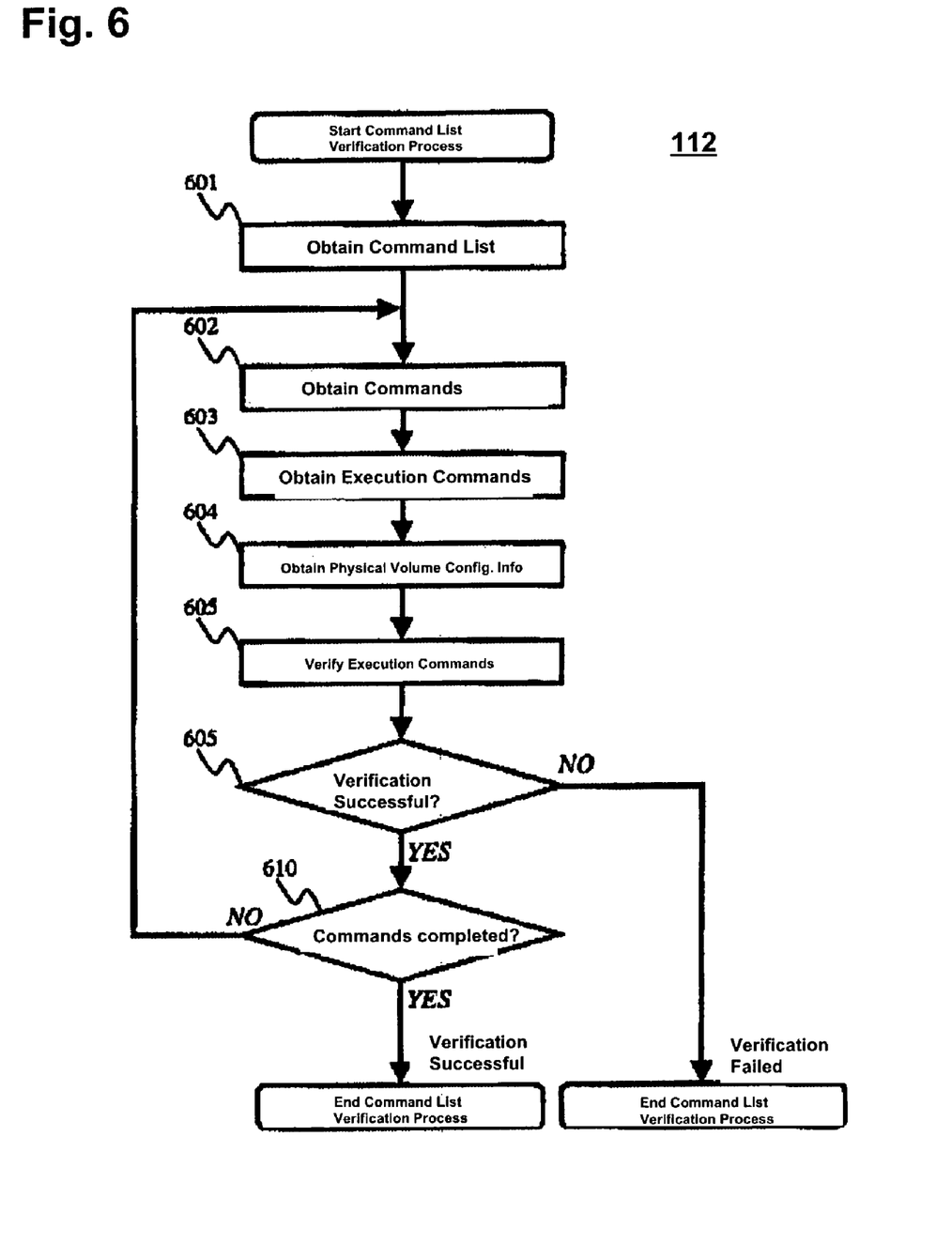
FIG. 6 shows a flowchart of a command list verification process in the volume management system of the present embodiment.

FIG. 6 is a flow chart of a command list verification process (Step 112) performed by the volume command verification program 240 in accordance with the present embodiment shown in FIG. 1. The volume command verification program 240 receives as an input an identification number for a command list to be verified, and starts verifying the command list by using the command list verification section 241 and the volume configuration acquisition section 242.

In Step 601, the command list verification section 241 acquires the command list to be verified from the command list 270 stored in the external storage 202.

In Step 602, the command list verification section 241 acquires commands having the identification number of the command list acquired in Step 601 from the commands 271 stored in the external storage 202. In Step 603, the command list verification section 241 acquires execution commands from the commands acquired in Step 602. In Step 604, the volume configuration acquisition section 242 acquires the volume configuration concerning the execution commands acquired in step 603 from the volume configuration information 280 of the external storage 202. In Step 605, the command list verification section 241 uses the volume configuration acquired in Step 604 to determine whether the execution commands acquired in Step 603 are executable by performing a simulation when the volume is set.

In Step 606, if the verification of the execution commands in Step 605 is failed, the command list verification section 241 informs the user that the verification is failed, and terminates the command list verification process. If the verification is successful, the process proceeds to Step 610.

In Step 610, the command list verification section 241 repeats Steps 602 through 605 until the verification of all the items of the execution commands included in the command list acquired in Step 601 is completed. If the verification of all the commands is successful, the user is notified of the success in verification, and the command list verification is terminated.

Figure 7:
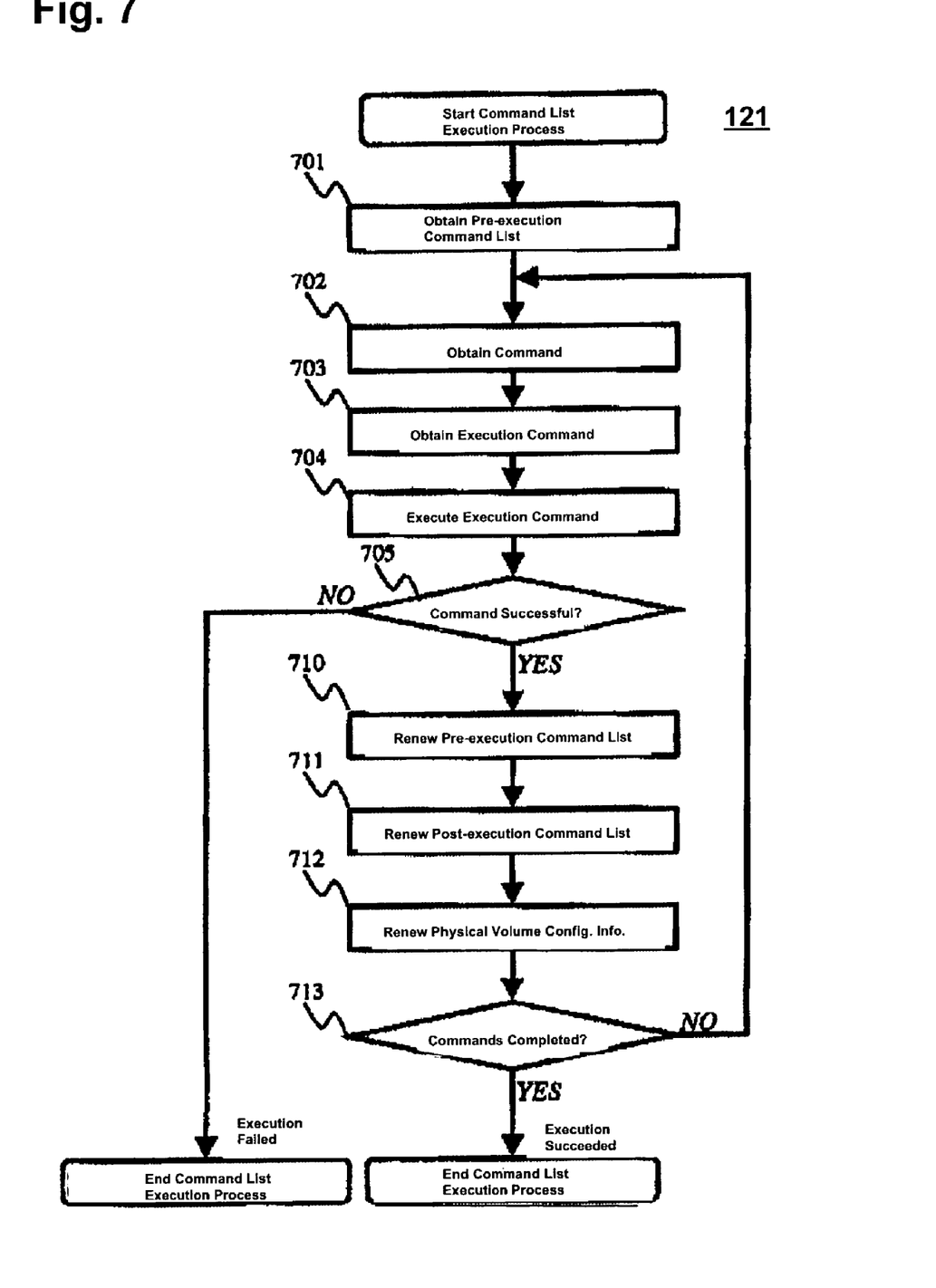
FIG. 7 shows a flowchart of a command list execution process in the volume management system of the present embodiment.

FIG. 7 is a flow chart of the command list execution process (Step 121) performed by the volume command execution program 250 in accordance with the present embodiment in FIG. 1. The volume command execution program 250 receives an identification number of the command list to be executed as an input, and starts the execution of the command list using the command list execution section 252.

In Step 701, the command list execution section 252 acquires the command list to be executed from the command list 270 stored in the external storage 202.

In Step 702, the command list execution section 252 acquires commands having the identification number of the command list acquired in Step 701 from the commands 271 stored in the external storage 202. In Step 703, the command list execution section 252 acquires execution commands from the commands acquired in Step 702. In Step 704, the command list execution section 252 and the storage apparatus operation program call section 253 use the server operation program 222, the switch operation program 223 and the storage operation program 224 to execute the execution commands acquired in Step 703 for the server 204, the switch 205 and the storage 206, respectively.

In Step 705, if the command execution in Step 704 is failed, the user is notified of the failure, and the command list execution process is terminated. If Step 704 is successful, the process proceeds to Step 710.

In Step 710, the command list renewal section 251 renews the pre-execution command list 160 by deleting the commands executed in Step 704. In Step 711, the command list renewal section 251 renews the post-execution command list 161 by adding the commands acquired in Step 703. In Step. 712, the volume configuration information renewal section 254 renews the physical volume configuration information 280 on the basis of the result of the execution commands executed in Step 704.

In Step 713, the command list execution section 252 repeats the Steps 702 to 713 until the execution of the execution commands is completed for all of the commands included in the command list acquired in Step 701. When all of the commands are executed, the user is notified that the execution of the command list has been successful, and the command list execution process is terminated.

Figure 8:
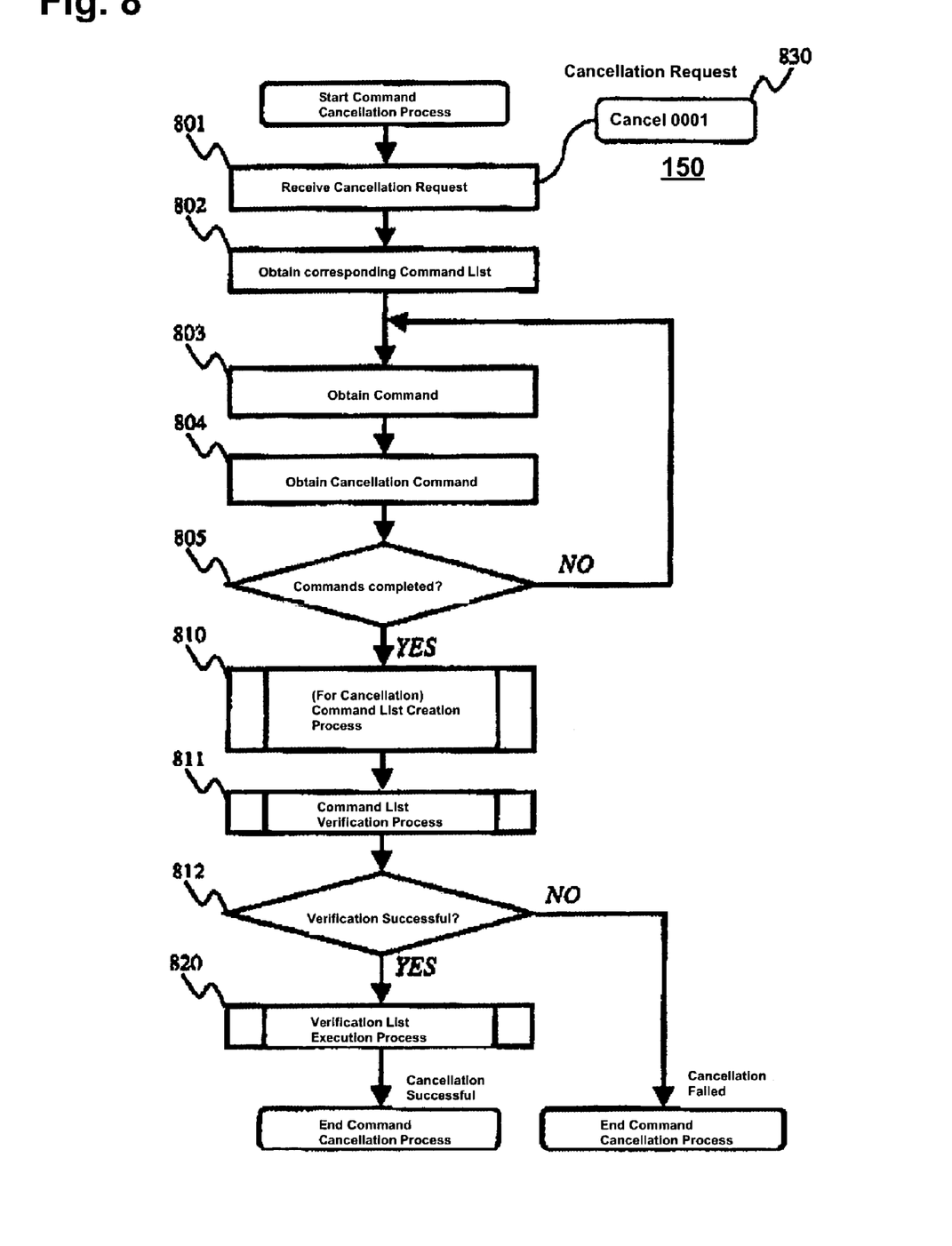
FIG. 8 shows a flowchart of a command cancellation process in the volume management system of the present embodiment.

FIG. 8 is a flow chart of the command cancellation process (Step 150) in the volume control system 200 of the present embodiment shown in FIG. 1.

In Step 801, the volume control system 200 receives a cancellation request 830 for a command list that is designated to be executed in stages, and has not yet met the execution conditions. In Step 802, the volume command management program 230 acquires the command list requested by the user to be cancelled from the command list 270 stored in the external storage 202.

In Step 803, the volume control system 200 acquires commands having the identification number of the command list acquired in Step 802 from the commands 271 stored in the external storage 202. In Step 804, the volume control system 200 acquires the execution state of the commands acquired in Step 803, and acquires cancellation commands if the state of execution indicates that the commands have been executed.

In Step 805, the volume control system 200 repeats Steps 803 and 804 for all of the commands included in the command list acquired in Step 802, and the process proceeds to Step 810.

In Step 810, the volume command management program 230 uses the cancellation commands acquired in Steps 803 and 804 to create a cancellation command list. In Step 811, the volume command verification program 240 conducts a verification process on the cancellation command list created in Step 810 by performing a simulation.

In Step 812, the volume control system 200 moves on to Step 820 if the verification is successful. If not, the volume control system informs the user of the failure and terminates the command cancellation process. In Step 820, the volume command execution program 250 performs the execute process on the command list created in Step 810, thereafter informs the user of the success in the cancellation, and terminates the command cancellation process.

Figure 9:
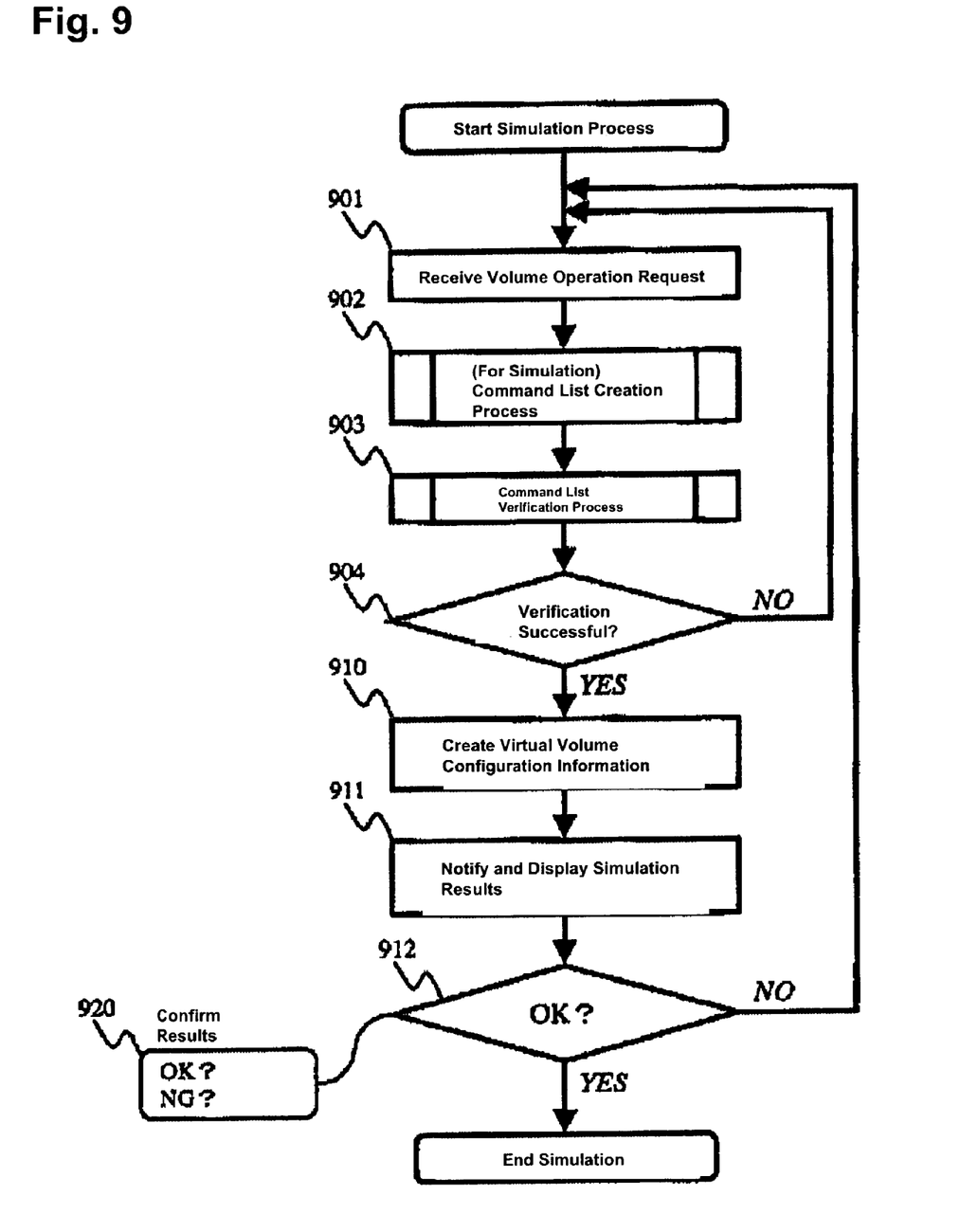
FIG. 9 shows a flowchart of a simulation process performed upon setting volumes in the volume management system of the present embodiment.

FIG. 9 is a flow chart of a simulation process in the present embodiment indicated in FIG. 1 to be performed when the volume is set in the volume control system. The command list verification section 241 of FIG. 2 executes the simulation when the volume is set in the command list verification (Step 112) FIG. 1.

In Step 901, the volume control system 200 receives a volume operation request from the user. In Step 902, the volume command management program 230 creates a command list for simulation based on the volume operation control request received in Step 901. In Step 903, the volume command verification program 240 performs a simulation of the volume setting operation process to thereby verify the command list created in Step 902.

In Step 904, the process proceeds to Step 910 if the verification process on the command list executed in Step 903 is successful. If the verification process is failed, the process returns to Step 901 to receive a request from the user.

In Step 910, the volume command execution program 250 creates a virtual volume configuration information reflecting the executed results of the command list created in Step 902. In Step 911, the virtual volume configuration information created in Step 910 is used to notify the user of the success in verification and the results of the simulation.

In Step 912, the volume control system 200 attempts to acquire a confirmation 920 from the user as to whether the simulation results are satisfactory, and terminates the simulation if the user is satisfied with the results. If not, the simulation process is resumed from Step 901.

In accordance with the present invention, run commands can be cancelled even after an erroneous volume operation has been performed by human error. The human error can be detected before the execution of the run commands to thereby reduce the impact on the user system by such human error.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A volume management method for a storage operation/management system that manages storage apparatuses including at least a storage, a switch and a server, the volume management method comprising the steps of:
   creating a command list including commands to be executed for the respective storage apparatuses to accomplish a volume operation request received;
   verifying the commands included in the command list; and
   executing the commands based on the command list, wherein the commands are executed in multiple stages for the storage apparatuses according to execution commands stored in the command list, wherein only a part of the commands that is cancelable is executed, and the other part of the commands is executed when all pre-registered execution conditions for the commands are met.

2. A volume management method according to claim 1, wherein at least one of the commands for the respective storage apparatuses are cancelable, execution commands and cancellation commands for canceling the execution commands are created at the time the command list is created.

3. A volume management method according to claim 1, wherein the command list is verified with a physical volume configuration information that is obtained in advance by a program that operates the storage apparatuses.

4. A volume management method according to claim 3, further comprising the steps of creating a virtual volume configuration information that reflects results of executing the command list whose verification has been successful on the physical volume configuration information, and displaying the virtual volume configuration information.

5. A volume management method according to claim 1, wherein the volume operation request is executed in stages based on the command list.

6. A volume management method according to claim 1, further comprising the steps of obtaining a physical volume configuration information by a program that operates the storage apparatuses in the step of verification, and verifying the command list when the program that operates the storage apparatuses is directly executed.

7. A volume management method according to claim 1, wherein the commands are executed for the storage apparatuses by a program that operates the storage apparatuses according to execution commands stored in the command list.

8. A volume management method according to claim 1, wherein the commands are executed in multiple stages for the storage apparatuses according to execution commands stored in the command list, wherein any of the commands that has been executed is cancelled when a cancellation request is issued before pre-registered execution conditions for the commands are met.

9. A volume management method for a storage operation/management system that manages storage apparatuses including at least a storage, a switch and a server, the volume management method comprising the steps of:
   creating a command list including commands to be executed for the respective storage apparatuses to accomplish a volume operation request received;
   verifying the commands included in the command list; and
   executing the commands based on the command list, wherein the commands are executed in multiple stages for the storage apparatuses according to execution commands stored in the command list, wherein a part of the commands that remains unexecuted is executed when pre-registered execution conditions for the commands are met due to occurrence of events including at least passage of time and volume increase.

10. A volume management apparatus for a storage operation/management system that manages storage apparatuses including at least a storage, a switch and a server, the volume management apparatus comprising:
   a section that creates a command list including commands to be executed for the respective storage apparatuses to accomplish a volume operation request received;
   a section that verifies the commands included in the command list; and
   a section that executes the commands based on the command list, wherein the command are executed in multiple stages for the storage apparatuses according to execution commands stored in the command list, wherein only a part of the commands that is cancelable is executed, and the other part of the commands is executed when all pre-registered execution conditions for the commands are met.

11. A volume management apparatus according to claim 10, wherein at least one of the commands for the respective storage apparatuses are cancelable, and further comprising a section that creates execution commands and cancellation commands for canceling the execution commands at the time the command list is created.

12. A volume management apparatus according to claim 10, further comprising a program that operates the storage apparatuses, and a section that obtains a physical volume configuration information by the program, wherein the command list is verified with the physical volume configuration information that is obtained in advance by the program.

13. A volume management apparatus according to claim 12, further comprising a section that creates a virtual volume configuration information that reflects results of executing the command list whose verification has been successful on the physical volume configuration information, and a display device that displays the virtual volume configuration information.

14. A volume management apparatus according to claim 10, wherein the volume operation request is executed in multiple stages based on the command list.

15. A volume management apparatus according to claim 10, further comprising a program that operates the storage apparatuses, wherein a physical volume configuration information is obtained by the program when the command list is verified, and the command list is also verified when the program is directly executed.

16. A volume management apparatus according to claim 10, further comprising a program that operates the storage apparatuses, wherein the commands are executed for the storage apparatuses by the program according to execution commands stored in the command list.

17. A volume management apparatus according to claim 10, wherein the commands are executed in multiple stages for the storage apparatuses according to execution commands stored in the command list, wherein any of the commands that has been executed is cancelled when a cancellation request is issued before pre-registered execution conditions for the commands are met.

18. A volume management apparatus for a storage operation/management system that manages storage apparatuses including at least a storage, a switch and a server, the volume management apparatus comprising:

a section that creates a command list including commands to be executed for the respective storage apparatuses to accomplish a volume operation request received;

a section that verifies the commands included in the command list; and a section that executes the commands based on the command list, wherein the commands are executed in multiple stages for the storage apparatuses according to execution commands stored in the command list, wherein a part of the commands that remains unexecuted is executed when pre-registered execution conditions for the commands are met due to occurrence of events including at least passage of time and volume increase.

* * * * *